United States Patent [19]

Rüll

[11] 4,140,373
[45] Feb. 20, 1979

[54] DUAL-HOLOGRAM IDENTITY CARD

[75] Inventor: Hartwig Rüll, Furstenfeldbruck, Fed. Rep. of Germany

[73] Assignee: Siemens Aktiengesellschaft, Berlin & Munich, Fed. Rep. of Germany

[21] Appl. No.: 731,439

[22] Filed: Oct. 12, 1976

[30] Foreign Application Priority Data

Oct. 14, 1975 [DE] Fed. Rep. of Germany ....... 2546007

[51] Int. Cl.$^2$ .............................................. G02B 27/00
[52] U.S. Cl. ...................................... 350/3.77; 40/2.2; 283/7; 350/3.67
[58] Field of Search ................. 350/3.5, 3.60, 3.75, 350/3.77, 3.81, 3.85; 283/6, 7; 40/2.2

[56] References Cited

U.S. PATENT DOCUMENTS

| 3,615,123 | 10/1971 | Wuerker | 350/3.5 |
| 3,620,590 | 11/1971 | Barker | 350/3.5 |
| 3,643,216 | 2/1972 | Greenaway et al. | 350/3.5 X |
| 3,647,275 | 3/1972 | Ward | 350/3.5 |
| 3,807,859 | 4/1974 | Sugaya et al. | 350/3.5 X |
| 4,014,602 | 3/1977 | Ruell | 350/3.5 |

OTHER PUBLICATIONS

Wyant, "Testing Aspherics Using Two-Wavelength Holography", *Applied Optics*, vol. 10, No. 9, Sep. 1971, pp. 2113–2118.

*Primary Examiner*—John K. Corbin
*Assistant Examiner*—John D. Lee
*Attorney, Agent, or Firm*—Hill, Gross, Simpson, Van Santen, Steadman, Chiara & Simpson

[57] ABSTRACT

An identity card is secured against forgery of the information thereupon and the appearance thereof by imparting coded information holographically to a photosensitive sheet of the card as coded, binary, optical bits in a pair of overlapping holograms, one hologram being readable only in coherent visible light and the other being readable only in coherent light outside the visible spectrum. The information is thereby made machine-readable.

4 Claims, 1 Drawing Figure

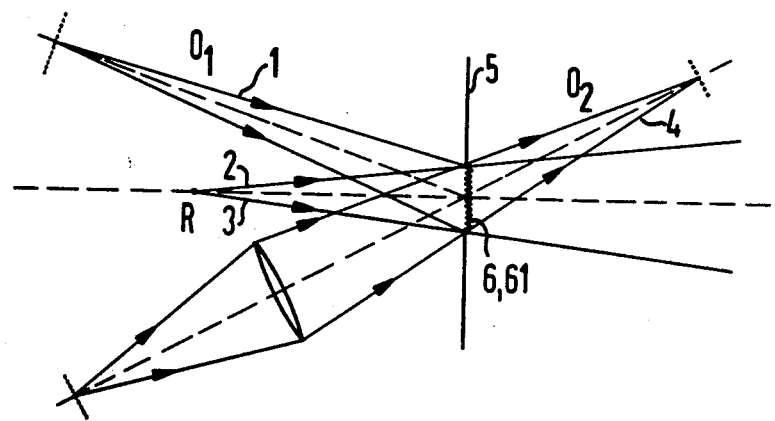

DUAL-HOLOGRAM IDENTITY CARD

BACKGROUND OF THE INVENTION

1. Field of the Invention

The present invention relates to forgery-proof identity cards.

2. The Prior Art

In German Auslegeschrift No. 2501604 corresponding to my U.S. Pat. 4,014,602 an identity card was disclosed having a first transparent sheet of material carrying on its underside conventional printed information. Security measures including metal structures, fluorescing materials, and secure impressions are also employed with the first sheet of material. A second sheet of material is bonded beneath the first, transparent layer and carries a phase or amplitude hologram designed for read-out by transmission or reflection. The hologram contains, for instance, the visually perceptible information of the first layer as a direct recording. Such an identity card is highly secure against forgery but can be read and verified using simple and inexpensive equipment.

SUMMARY OF THE INVENTION

An identity card has a photo-sensitive sheet of material upon which is formed, as a security device, a pair of overlapping hologram patterns coded with information and machine-readable binary optical bits, one of said pair of patterns being readable in coherent visible light only and a second of said pair of patterns being readable only in coherent light outside the visible spectrum. The coding of the information may be different in each of the two holograms.

BRIEF DESCRIPTION OF THE DRAWING

The single drawing FIGURE shows schematically an arrangement for recording information upon a sheet of an identity card in accordance with the invention.

DESCRIPTION OF THE PREFERRED EMBODIMENTS

In the drawing FIGURE, a photo-sensitive recording medium 5 which is useable as one layer of an identity card has a first hologram 6 applied thereto upon interference of a divergent object wave 1 with a reference wave 2. The object wave 1 contains binary information which is to be holographically stored upon the medium 5. Following application of the first hologram 6, a second hologram 61 is superimposed upon the first hologram 6, by interference of an object wave 4 with a reference wave 3. The object wave here is a convergent spherical wave; the second reference wave 3 may be identical to the wave 2. The object waves 1 and 4 and the reference waves 2 and 3 may have the same wavelengths for recording of the holograms 6, 61. Is also possible to record such holograms using different wavelengths of light for the pairs of object and reference waves 1, 2, and 4, 3. Where different wavelengths are desirable, a helium-neon laser having a first wavelength of 0.6328 microns and a second wavelength of 1.15 microns is particularly suitable, since if the resonator quality factor is suitably arranged, both wavelengths may be obtained simultaneously from the same source. Alternatively, less expensive semi-conductor lasers can be used sequentially as coherent infrared light sources.

Real images reconstructed from the two recorded holograms can be read out by machine by use of suitable detectors converting individual light spots into electrical pulses. Electronic analog data can be converted readily into an optical binary bit pattern by any of many known optical-electronic tranducers, such as switchable liquid crystal cells, Cds elements, PLZT ceramic, or acousto-optical modulators.

It is also possible to record the two holograms 6, 61 sequentially rather than simultaneously. This sequential recording permits use of coherent light sources with different wavelengths.

Although various minor modifications may be suggested by those versed in the art, it should be understood that I wish to embody within the scope of the patent warranted hereon all such modifications as reasonably and properly come within the scope of my contribution to the art.

I claim as my invention:

1. A method of securing a piece of identification against forgery thereof, comprising the steps:
    encoding first desired information by a secure code into a first binary bit pattern;
    encoding second desired information by a second secure code into a second binary bit pattern;
    recording said first and second patterns in overlapping holograms upon a photo-sensitive sheet of material in said piece of identification, and
    reading one of said patterns in visible coherent light only and the second of said patterns in invisible coherent light only.

2. The method defined in claim 1, wherein the first and second hologram patterns are recorded with reference waves of the same wavelength.

3. The method defined in claim 1, wherein the first and second hologram patterns are recorded simultaneously, with a laser giving coherent light at two different wavelengths.

4. The method defined in claim 1, wherein the first and second hologram patterns are recorded sequentially, with different lasers having different wavelengths of light.

* * * * *